Feb. 12, 1957 G. H. KLUMB ET AL 2,781,312
SELF-INDICATING ION EXCHANGE AND/OR FILTER APPARATUS
Filed April 10, 1953
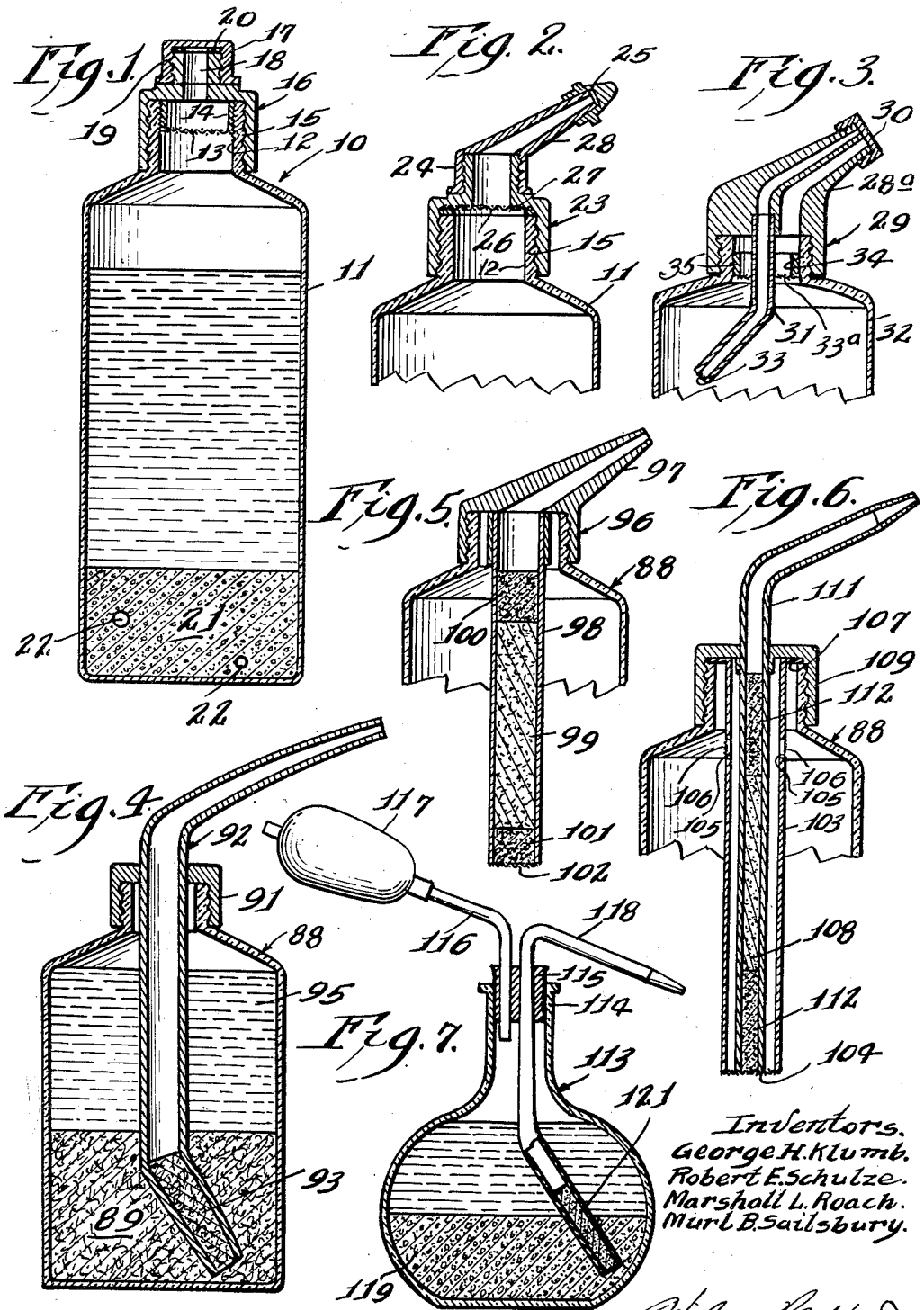
Inventors.
George H. Klumb.
Robert E. Schulze.
Marshall L. Roach.
Murl B. Sailsbury.
By Wilson Gepperl
Attorneys.

United States Patent Office 2,781,312
Patented Feb. 12, 1957

2,781,312

SELF-INDICATING ION EXCHANGE AND/OR FILTER APPARATUS

George H. Klumb, Northbrook, Robert E. Schulze, Deerfield, Marshall L. Roach, Glencoe, and Murl B. Sailsbury, Northbrook, Ill., assignors to Culligan, Inc., Northbrook, Ill., a corporation of Delaware Application April 10, 1953, Serial No. 348,014

5 Claims. (Cl. 210—24)

The present invention relates to the self-indicating ion exchange and/or filter apparatus, and more particularly to a novel process for the purification of portions of the available water supply and to a novel manner and equipment for carrying out this process in a unique and convenient manner.

In the novel embodiment of the invention which provides for the substantially complete removal of impurities from water, it is the concept of the invention to employ ion exchange materials for removal of dissolved ionized solids, to employ a filter and/or adsorbent material for removal of dissolved gases, suspended solids, and/or color bodies, and to employ disinfecting agents or bacteria removal means where required to assure freedom from bacterial contamination.

When chlorine alone is the objectionable factor from the standpoint of taste and/or odor it is the concept of the present invention, as described in system "D" of the specification, that it may be removed by the use of an adsorptive filter material within the structure of the invention.

When hydrogen sulfide is the objectionable factor from the standpoint of the taste and/or odor, it is contemplated by the present invention that it may be removed by employing an oxidizing material as described in systems "E" and "F" of the specification and/or an adsorptive filter material as described in system "D" of the specification.

When fluorides are the objectionable factor from the standpoint of endemic dental fluorosis or for other reasons, the present invention contemplates that they may be removed by employing either anion exchange materials, as described in system "G" of the specification or tricalcium phosphate as described in system "H" of the specification.

When nitrates are the objectionable factor from the standpoint of methemoglobinemia or for other reasons, it is contemplated by the present invention that they may be removed by employing anion exchange materials as described in system "G" of the specification.

When organic color is the objectionable factor, it is the concept of the present invention that it may be removed by employing an adsorptive filter material as described in system "D" of the specification.

When iron and/or manganese are the objectionable factors from the standpoint of color, taste, staining and/or color-darkening of beverages or solutions, it is contemplated by the present invention that the soluble iron and/or manganese may be removed by means of a cation exchange material and that the suspended iron may then be removed by a filter material as described in system "I" of the specification, or iron and/or manganese may be removed by treatment with an oxidizing agent, and that the insoluble oxidation products may be removed by a filter material, all as described in systems "E" and "F" of the specifications.

When high mineralization or salinity is the objectionable factor for any reason, such as taste and/or physiological effect, it is the concept of this invention that it may be removed by deionization employing a cation exchange material in the hydrogen state and an anion exchange material in either the hydroxyl or carbonate state, as described in system "C" of the specification.

The invention further resides in the construction, combination and arrangement of parts illustrated in the accompanying drawings and while there is disclosed therein certain illustrative embodiments, it is to be understood that the same is susceptible of modification and change and comprehends other features and constructions without departing from the spirit of the invention.

In the drawings:

Figure 1 is a view in vertical cross section through a simplified form of the novel water treating unit or assembly employing a compressible plastic container;

Fig. 2 is a fragmentary view in vertical cross section through the upper open end of the container equipped with an alternate construction of dispensing cap;

Fig. 3 is a view similar to Fig. 2 but disclosing another embodiment of a dispensing cap;

Fig. 4 is a view in vertical cross section through a laboratory wash bottle deionization unit;

Fig. 5 is a fragmentary view in vertical cross section through the upper end of a container or laboratory wash bottle with another form of combined cap, water treatment and filter stem;

Fig. 6 is a fragmentary view in vertical cross section through a laboratory wash bottle or container with another form of filter stem and filter directing tube;

Fig. 7 is a view in vertical cross section through a common glass flask or rigid type laboratory wash bottle having a stopper provided with a tube for applying pressure to the interior of the flask and a directing tube for collecting and dispensing treated water from the wash bottle.

Referring more particularly to the disclosure in the drawings and to the novel illustrative embodiments therein selected, Fig. 1 discloses the novel water treating device or unit 10 in what might be construed as its simplest form. In this embodiment, the unit 10 comprises a plastic container or receptacle 11 having compressible, elastic or resilient properties and preferably of a transparent material to permit the operator to view the contents thereof. In and bridging the neck 12 of the container or receptacle is mounted a filter screen 13 which is preferably retained therein by a ring or collar 14.

The exterior or periphery of the neck 12 is preferably provided with a continuous or interrupted thread 15 for detachably receiving a dispensing screw cap 16. This cap is shown as constructed or formed of two pieces or parts, the upper part or closure 17 being of substantially smaller size and adapted to seal the opening through a passage or pouring spout 18 in the upper reduced end 19 of the cap 16. A sealing gasket 20 may be interposed between the upper reduced end 19 of the cap 16 and the adjacent underside of the closure 17 to effectively seal off the contents of the container, when desired. Such contents include a bed or mass of ion exchange or water treating materials 21 which partly fills the container or receptacle 11. One or more disrupters 22 such as relatively heavy mobile particles of metal or other suitable material capable of dislodging portions of the ion exchange materials which may have a tendency to cake, may be added. These ion exchange or water treating materials may be affixed with an indicator.

Fig. 2 discloses an alternate form of dispensing cap 23 for the container or receptacle 11. This cap is similar to that of Fig. 1, except for the pouring spout 24, the closure 25 therefor and the location and arrangement of the filter screen 26. In place of the substantially cup-shaped screen 13 of Fig. 1, this embodiment provides a flat screen or foraminous member 26 that is clamped between an inturned shoulder 27 on the cap 23 and the upper end of the neck 12 of the container 11 to cover its discharge passage or outlet. The nozzle 28 of the pouring spout 24 is angularly arranged and preferably tapered and sealed by means of the closure 25 which is slipped onto and frictionally held upon the open end of the nozzle. Such a closure may be of rubber, natural or compounded synthetic, or of other suitable plastic composition having the desired resilient properties and adapted to effect a tight seal.

Fig. 3 discloses a cap 29 having an air vent 31 having one end projecting into the container or receptacle 32 and thereat provided with a screen 33. This cap is preferably for use with a rigid glass container or receptacle for water treatment. The screen 33ᵃ retained in the neck 34 of the bottle or container 32 by a ring 35, provides a filter preventing escape of the ion exchange or water treating materials. A closure 30 is provided for the end of the spout 23ᵃ.

In system "A," used for the production of high quality deionized water, the container shown in Fig. 1 is filled in part with cation exchange material, substantially in the hydrogen form and in part with anion exchange material substantially in either the hydroxyl or carbonate form. The cation exchange resins that may be used in the mixed bed include the sulfated or sulfonated phenol-formaldehyde resins such as are disclosed in U. S. Patents Nos. 2,191,853, 2,228,159 and 2,228,160; the sulfonated styrene-divinyl benzene resins described in U. S. Patent No. 2,366,007; the cross-linked polymers of polymerizable acids described in U. S. Patents Nos. 2,340,110 and 2,340,111; and the dense, sulfonated, carbonaceous materials of the type described in U. S. Patent No. 2,191,060.

The anion exchange material may be of the weakly or strongly basic type, depending on the quality of water desired, substantially insoluble in water and stable in the presence of the cation exchanger employed. Among such materials may be included the polyamine-phenolic or the polyamine-polystyrene resins as the weakly basic type, and the quaternary ammonium resins as the strong basic type.

In the employment of system "A," cap 16 is removed and the container 11 is filled with water above the bed or loose mass of ion exchange materials by compressing plastic container 11 to expel air and then allowing the resilient container to return to its original shape while flowing water into the neck of the container. Cap 16 is then replaced and the unit is now ready to prepare deionized water. The unit is now inverted to cause the ion exchange materials, which momentarily occupy a position in such inversion substantially above the greater portion of the water to be treated, to pass and disperse downwardly through the water. As the ion exchange materials pass through the untreated water, ion exchange, between the exchange materials and the dissolved ions in the water, takes place to produce a water substantially lower in dissolved ionizable matter. The unit is then returned to its original upright position and the exchange materials are again permitted to pass through the water, causing additional ionizable matter to be removed from the water. This cycle may be repeated until the dissolved ionized solids are substantially completely removed.

The cap 16 or the pour cap or closure 17 is then removed and the water is expelled from the container 11 by squeezing this elastic or resilient container 11. In the preferred use of the unit only the pour cap or closure 17 is removed so that treated water can be directed accurately into small openings without difficulty. After squeezing the elastic container, the container is allowed to return to its original shape whereby air is drawn into the space previously occupied by the water. In an inverted position, by repeated squeezing and releasing of the container substantially all the treated water can be removed from the unit, whilst the filter screen 13 retains the ion exchange materials in the container 11.

In example 3, an 8 ounce unit containing 113.3 ml. of ion exchange materials and approximately 6 fluid ounces of untreated water initially containing 153 p. p. m. of dissolved ionized solids having a specific resistance of 4000 ohm/cm.$^3$ was cycled four times in 25 seconds in the manner described above. Treated water so produced in the unit was expelled and analyzed as to its quality. It was found that the treated water had a specific resistance of 180,000 to 200,000 ohms/cm.$^3$.

In example 4, in the same unit or in a like unit, containing the same amount of ion exchange materials as described above and charged with approximately 6 fluid ounces of untreated water having a specific resistance of 4000 ohm/cm.$^3$, the unit was not inverted but allowed to stand quietly for 30 minutes with substantially all of the water above the ion exchange material. After this period of time the water was expelled and analyzed as to its quality. It was found that the water expelled from this unit had a specific resistance less than 12,500 ohms/cm.$^3$.

In example 5, in the same unit or in a like unit, containing the same amount of ion exchange materials as described above and charged with approximately 6 fluid ounces of untreated water having a specific resistance of 4000 ohm/cm.$^3$, the unit was held in a horizontal position and slowly shaken forward and backward in a line parallel to the longitudinal axis of the container. The unit was shaken in this manner for 20 seconds, after which the water was expelled from the unit and analyzed as to its quality. It was found that the water expelled after this method of operation had a specific resistance of 180,000 ohms/cm.$^3$.

In example 6, in the same unit or in a like unit, containing the same amount of ion exchange materials as described above and charged with approximately 6 fluid ounces of untreated water having a specific resistance of 4000 ohm/cm.$^3$, the unit was shaken in such a manner as to cause the ion exchange materials to be dispersed throughout the water to be treated. The unit was shaken in this manner for 10 seconds, after which the water was expelled from the unit and analyzed as to its quality. It was found that the water expelled after this method of operation had a specific resistance of 200,000 to 800,000 ohms/cm.$^3$.

When either the inversion method or the dispersion shaking method are used during the treatment operation, it was found that the use of disrupters 21, being of such material substantially inert and insoluble in water, assisted in dislodging portions of the ion exchange materials which may cake in part in the container and created greater turbulence and better dispersion of the ion exchange materials in the water being treated. While these disrupters are an adjunct to the dispersing operation, the water treatment process can be performed without difficulty in their absence.

This novel unit may be refilled over and over again with water for treatment and said unit may be successively operated in the manners described above until the ion exchange materials are no longer capable of removing dissolved ionizable matter to the degree desired. As the extent to which dissolved ionizable matter has been removed from water is not apparent except by the use of special instruments, apparatus or chemical determinations, it is an important feature of the present invention to provide simple yet accurate and effective indicating means for determining water quality integral with or separate from the unit.

In the field of deionization it is common to use exchange materials which have been dyed with suitable dyes to provide visual indication of the approximate exhaustion point of the ion exchange mineral by a change of color at this point. This color change occurs because the exchange material is chemically different in the exhausted state than it is in the active state. In deionization a pH change within the ion exchange materials occurs with this chemical change and this change usually causes the color change of the ion exchange materials. While these dyes may be used as an indication means, the color change is not definite or accurate enough to be satisfactory, as the color change is an indication of the degree of exhaustion of the ion exchange material rather than as an indication of water quality.

In such prior deionization method the resin employed changes color as it becomes exhausted and thus does not indicate the condition of the water being treated. In the present novel method, the color of the water indicates that the resin is partially or totally exhausted and, if the resin is but partially exhausted, the color imparted to the water will disappear on shaking and thus assure the preparation of a quality water. In the event the resin is totally or substantially wholly exhausted, the color imparted to the water by the dye or coloring agent remains in the water and visually indicates that the quality of the water to be dispensed is poor.

The unique means and manner of indication as herein contemplated and which may be used as part of or in conjunction with the present invention, employs a dye carried on one of the exchange materials, preferably the anion, which dye in the process of water treatment in the unit is immediately released to color the untreated water when the exchange materials approach, but have not completely reached, an exhausted state, said dye then being completely readsorbed on the exchange material as the dissolved ionizable matter is substantially completely removed from the water.

It is a further feature of this novel indication means that once the color appears in the water it is not removed from this water as long as there are substantial quantities of ionizable matter in the water, but said color is removed from the water as long as the ion exchange materials have sufficient activity to effect substantially complete removal of dissolved ionizable solids. Thus this novel indication means provides not only a simple and accurate means for indicating the quality of the water, but it also provides means for determining the exhaustion point of the exchange materials.

As in example 7, 45.3 milliliters of cation exchange material of the polystyrene type, substantially in the hydrogen state, and 68 milliliters of anion exchange material of the quaternary ammonium type, substantially in the hydroxyl state and dyed with p-dimethylaminoazobenzene-o-carboxylic acid, were placed in a sixteen ounce bottle. 400 milliliters of water of approximately 1100 ohms specific resistance was allowed to flow into the treating bottle and the cap placed on the bottle. The treating bottle was then shaken to cause the exchange materials to pass through the water being treated. After shaking for two minutes, the water was decanted from the bottle, and when checked for quality this treated water showed a specific resistance of 1,00,000 ohms and was colorless.

Additional small samples of water were treated in a like manner until 3890 milliliters had been treated. Each sample was colorless after treatment and had a specific resistance of 140,000 ohms or above. A 370 milliliter sample of water was then added to the treating bottle for treatment, and after shaking with the loose bed of exchange material for 45 seconds, showed a slight pink color. The water being treated was then decanted from the treating bottle, and when checked for quality showed a specific resistance of less than 25,000 ohms. This same water sample was returned to the bottle and shaken for an additional 45 seconds. At this point, the water being treated was colorless and showed a specific resistance of 100,000 ohms.

Additional samples of water were treated in a like manner and in all cases a pink color appeared in the water in the early stages of each individual treatment, and after a treatment period of two minutes the water was clear and had a specific resistance above 35,000 ohms until 5,430 milliliters had been treated. The next sample of water was then added to the treating bottle, and after shaking for 5 minutes the water being treated was still pink in color and had a specific resistance of less than 25,000 ohms. At this point a substantial amount of the anion exchange material had turned red and was considered exhausted.

Among other dyes suitable for the above purpose is sodium p-dimethylaminoazobenzenesulfonate.

It will be apparent from the present disclosure that in the operation of fixed bed deionization units such as are now being employed, this method of indication may be employed together with a photoelectric device responsive to a color change to indicate the exhaustion point of the deionization unit or said photoelectric device may be so designed to cause flow to cease and/or be used to control portions of the regeneration or deionization cycle.

In Fig. 4 is disclosed a laboratory wash bottle deionization unit comprised of an elastic container or receptacle 88 partly filled with water treating materials 89 and having a cap 91 detachably affixed to the container by means of a threaded connection. A directing filter tube 92 fits tightly into the cap 91 and contains filter material 93 in its base or lower end. This end of the tube projects into the bed or mass 89 or water treating material for treating the water 95 supplied to the container.

Fig. 5 discloses a combination cap, water treating unit and filter stem comprising a cap 96 detachably affixed to the neck of a container or receptacle 88, and provided with a pour spout 97. Attached to the cap 96 and depending into the container 88 which contains a water treating material as in Fig. 1, is a filter stem 98 containing a mass of water treating material 99 confined between filter material 100 and 101. A screen or foraminous member 102 may be attached to the base or lower end of the filter stem 98 in addition to, or as a substitute for the filter material 101. The filter materials 100 and 101 may comprise a glass wool filter or the like for maintaining the water treating materials therebetween.

In the disclosed embodiment of Fig. 6 the directing filter tube and stem for the laboratory wash bottle deionization unit comprises a stem 103 inserted into the neck of the container or receptacle 88 (Fig. 4) and equipped with a filter material or screen 104 at its base, air vents 105 covered with a filter material or screen 106 and located in the wall of stem 103 just below the neck of container 88, and an anchoring flange 107 projecting outwardly from stem 103 at its upper end. Cap 109 secures the stem 103 and directing filter tube 111 which contains water treating material 108 and filter material 112 in their operative positions.

Fig. 7 discloses a common rigid laboratory wash bottle comprising a glass flask 113 having a neck 114 into which is inserted a two-holed stopper 115. Into one of the holes in the stopper a tube 116 is inserted for applying pressure to the interior of flask 113. This pressure is normally applied either by blowing into the tube 116 or by forcing air into this tube by other means, such as air bulb 117. A directing tube 118 is inserted into the flask through the other hole in the stopper 115 for the purpose of collecting water from the interior of the flask and directing it as desired. The common rigid laboratory wash bottle described above is hereby converted into a deionization unit by employing the unique fluid deionization system previously disclosed, by the addition to the flask 113 of ion exchange material 119 and by employing a filter material 121 in the base of the directing tube 118.

In system "B" used for the production of highest quality deionized water for laboratory use the container 88 shown in Fig. 4 is filled in part with water treatment materials 89 consisting of cation exchange material substantially in the hydrogen form, and in part with anion exchange material substantially in hydroxyl form. The cation exchange resins which may be used in this system are the same as those described in system "A." The anion exchange materials that may be used must be of the strongly basic type, as described in system "A," in order to produce the highest quality water for laboratory purposes.

In the employment of system "B" cap 91 together with directing tube 92 is removed and the container 88 is filled with tap water. Cap 91, holding directing tube 92 is then replaced and the unit is ready to prepare deionized water. The unit is now inverted repeatedly or shaken in the manners described above with respect to system "A" in order to disperse or pass the ion exchange materials through the water to accomplish deionization. The process of inversion or shaking is continued until the dissolved ionized solids are substantially completely removed. In operation the resilient plastic container 88 is squeezed to expel deionized water through directing tube 92, while the ion exchange material is retained in the container by the filter material 93.

In system "C" which produces potable water through disinfection, and substantially complete removal of all impurities, dissolved or suspended commonly present in natural water, the combination cap, water treatment and filter stem shown in Fig. 5 replaces the cap 16 in Fig. 1 and is mounted on the neck of the container 88, which contains water treatment materials 21 similar to that in Fig. 1. The water treatment materials 21, which fill container 88 in part, are cation and anion exchange materials of the types and in the forms described in system "A" with the addition of a suitable disinfecting agent of limited solubility, such as chloromelamine, for the control of bacteria when desired.

The water treatment materials 99, confined by filter material 100 and 101, consist of an adsorbent material, such as activated carbon.

In the employment of system "C" cap 96 is removed and container 88 is filled with water to be treated. Cap 96 is then replaced and the unit is ready to prepare purified potable water. The unit is now inverted repeatedly, or shaken in the manners described above with respect to system "A," in order to disperse or pass the water treatment materials 21 through the water to accomplish deionization. The process of inversion or shaking is continued until the dissolved ionized solids are substantially completely removed.

Where the control of bacteria is desired, the disinfecting agent, as described above, must remain in contact with the water being disinfected for a period of approximately 15 to 20 minutes and maintain an excess or residual chlorine content, or its equivalent, in the water being treated of at least 0.3 p. p. m. of chlorine throughout the entire period of disinfection.

In operation, the resilient plastic container is squeezed to force or convey the water in container 88 into filter stem 98. While the insoluble water treatment materials in container 88, which have previously contacted the water, and suspended impurities are substantially removed by filter material 100 and 101 and/or screen 102, the dissolved non-ionized impurities and soluble residual disinfecting agent when present pass through screen 102 and filter material 101 and contact the water treatment material 99, in filter stem 98, which substantially completely removes said impurities and residual disinfecting agent. After passing through the water treatment material the water is purified and potable and is further conveyed to the point of use through the passage in the pouring spout 97.

In system "D," which produces water which is substantially free from color, taste and odor, the structures described in systems "A," "B" or "C" may be employed. The water treatment material which partially fills the container 11 (Figs. 1, 2 and 3), or 88 (Figs. 4, 5 and 6) preferably consists of an adsorbent material such as activated carbon in lieu of the ion exchange materials.

In operation, water to be treated is handled in accordance with the procedures described in system "A," "B" or "C." While organic color, taste and odor, such as produced by chlorine and hydrogen sulfide, and other substances, are partially or wholly removed together with suspended impurities, dissolved ionizable impurities are not normally removed by this system.

In system "E," which produces water which is substantially free from hydrogen sulfide, iron and manganese, the structures described in systems "B" and "C" may be employed.

In this system "E," the water treatment material, which partially fills container 88, consists of an insoluble oxidizing material, such as a material upon which the higher oxides of manganese have been precipitated or to which the higher oxides of manganese have been cemented. Manganese treated greens and the material described in U. S. Patent No. 2,145,901 are examples of this type of material.

In operation, water to be treated is handled in accordance with the procedures described in system "B" or "C." The hydrogen sulfide, iron and manganese in the water contacts the oxidizing material and are oxidized to insoluble sulfur and insoluble oxidation products of iron and manganese, which are in turn removed from the water by the filter materials as the water is forced through the filter materials 93 (Fig. 4) or 101 (Fig. 5). After passing through the filter material the treated water is substantially free from hydrogen sulfide, sulfur, iron and manganese, and is ready for use.

In system "F," which produces water which is substantially free from hydrogen sulfide, iron and manganese, the structures described in system "C" may be employed. The water treatment material which partially fills container 88 (Fig. 5) consists of an oxidizing agent of limited solubility, such as pellets or tablets of calcium hypochlorite, and the water treatment material 99 in filter stem 98, is an adsorptive material, such as activated carbon. In operation the water to be treated is handled in accordance with the procedure described in system "C."

In this system "F," hydrogen sulfide, iron and manganese in the water contacts the portion of the oxidizing material in the container or receptacle 88 which has dissolved in the water under treatment and are oxidized to insoluble sulfur, and insoluble oxidation products of iron and manganese, which are in turn removed from the water as the water is forced through the filter material 101 (Fig. 5). After the water passes through filter 101, it is substantially free from hydrogen sulfide, iron, manganese and their oxidation products, but may still contain residual amounts of dissolved oxidant which is substantially removed as the water contacts the water treatment material 99, after which the water is ready for use.

In system "G," which produces water which is substantially free from fluorides and nitrates, the structures used in system "A," "B" or "C" may be employed. The water treatment material which partially fills container 11 (Figs. 1, 2 and 3) or 88 (Figs. 4, 5 and 6), consists of an anion exchange material of the strongly basic type, as described in system "A," but being substantially in the chloride form, rather than the hydroxyl or carbonate form. In operation, water to be treated is handled in accordance with the procedures described in system "A," "B" or "C."

In system "G" the ionized nitrates and fluorides in the water to be treated are contacted by the ion exchange material and are removed by ion exchange with the chloride ion from the exchange material entering the water in place of the nitrate and/or fluoride ions. The treated water is expelled from the unit by squeezing the resilient plastic container while the screens and/or filter materials in the neck of the bottle or in or associated with the filter tubes, retain the anion exchange material in the container.

In system "H," which produces water which is substantially free from fluorides, the structures used in systems "A," "B" or "C" may be employed. The water treatment material, which partially fills the container, consists of an insoluble, highly porous and reactive granular form of tricalcium phosphate, such as is described in U. S. Patent No. 2,227,432. In operation, water to be treated is handled in accordance with the procedure described in system "A," "B" or "C."

In system "H" the fluorides in the water to be treated are contacted by the water treatment material described above, and are substantially completely removed. The exact functioning or mechanism of this separation is not known, although it is believed due to some type of adsorption or chemical reaction or both, and it is thought that a form of apatite $[(3Ca_3PO_4)_2 \cdot CaF_2]$, is formed. Treated water, substantially free from fluorides, is expelled from the unit by squeezing the resilient plastic container, while the screens and/or filter materials, retain the granular insoluble water treatment material which contains the fluoride removed from the water.

In system "I," which produces water which is substantially free from iron and manganese the structures used in system "B" or "C" may be employed. The water treatment material, which partially fills the container 88, consists of a cation exchange material of the types described in system "A," but being substantially in the sodium form rather than the hydrogen form. In operation, water to be treated is handled in accordance with the procedure described in system "B" or "C."

In system "I" the ionized iron and manganese in the water to be treated are contacted by the ion exchange material and are removed by ion exchange. Sodium ion from the exchange material enters the water in place of the iron and/or manganese ions, while insoluble or suspended iron and manganese are filtered by filter material 93 (Fig. 4) or 101 (Fig. 5), and the treated water, substantially free from iron and manganese, is expelled from the unit for use by squeezing the plastic container 88.

Having thus disclosed the invention, we claim:

1. Means for treating and purifying water from undesirable constituents contained therein, comprising a receptacle having an access opening and containing a loose mass of treating material and adapted to receive a supply of water to be treated, said treating material being loose within the receptacle and adapted to be freely dispersed through the water to purify the same, a filter for filtering the treated water and retaining in the receptacle the treating material and undesirable constituents and visual indicating means to impart color to the water being treated when the treating material is partially or wholly exhausted and thereby signal the operator when the quality of the treated water is below a specified standard.

2. In a portable water treatment unit for the purification of an available water supply, a receptacle, a loose mass of water treating material for repeated use in the purification of the water supply and a dye carried on said water treating material for indicating the state of exhaustion of said water treating material and the quality of the water being treated, said dye being released to color the untreated water as the water treating material approaches but has not completely reached an exhausted state, and being readsorbed on the water treating material as the dissolved ionizable material is substantially completely removed from the water.

3. Means for removal of undesirable constituents from natural water, comprising a bottle, a loose mass of a treating material partially filling the bottle and capable of repeated use to treat successive quantities of water, space above said loose mass for receiving the water to be treated, whereby upon shaking the bottle and its contents to permit the loose treating material to pass back and forth through the water to be treated, said undesirable constituents are removed, and visual indicating means for directly determining the quality of the treated water prior to discharge from the bottle and imparting color to the untreated water when the treating material approaches an exhausted state.

4. Means for the removal of undesirable constituents from natural water, comprising a resilient container of plastic composition having a discharge passage and a detachable pouring spout, a loose mass of water treating material partially filling the container but providing substantial space above said mass for receiving the water to be treated, said material being reusable to treat successive quantities of water, filtering means in said passage for filtering the effluent and preventing escape of the treating material, said container when upended or shaken causing dispersion of the treating material through the water to remove the undesirable constituents therefrom, and visual indicating means for imparting color to the untreated water when the treating material approaches an exhausted state.

5. Means for treating and purifying an available water supply containing undesirable constituents, comprising a container, a loose mass of water treating material partially filling said container and allowing space in said container for a quantity of water to be treated, said material being reusable to treat successive quantities of water, and visual indicating means for imparting color to the water in the container when the water treating material reaches an exhausted state and thereby indicate the condition of the water treating material and of the water being treated.

References Cited in the file of this patent

UNITED STATES PATENTS

| | | |
|---|---|---|
| 1,098,653 | Whisenant | June 2, 1914 |
| 1,336,214 | Forman | Apr. 6, 1920 |
| 1,751,671 | Webb | Mar. 25, 1930 |
| 1,978,440 | Shepard | Oct. 30, 1934 |
| 2,063,778 | Andrus | Dec. 8, 1936 |
| 2,087,036 | Andrus | July 13, 1937 |
| 2,117,091 | Gudmundsen | May 10, 1938 |
| 2,207,294 | Hubner et al. | July 9, 1940 |
| 2,249,832 | Hubschman | July 22, 1941 |
| 2,500,134 | Murray | Mar. 7, 1950 |
| 2,616,950 | Terpstra | Nov. 4, 1952 |
| 2,643,771 | Pick | June 30, 1953 |
| 2,682,268 | Ryan et al. | June 29, 1954 |

FOREIGN PATENTS

| | | |
|---|---|---|
| 83,542 | Germany | Oct. 16, 1895 |
| 295,004 | Great Britain | Dec. 20, 1928 |
| 576,970 | Great Britain | Apr. 30, 1946 |
| 577,449 | Great Britain | May 17, 1946 |

OTHER REFERENCES

Rohm and Haas Co. Bulletin, "Self-Indicating Amberlite for Monabled Deionization," May 1950.

Klaas: Modern Plastics, vol. 28, No. 1, September 1950, pp. 79, 80.

Arthur et al.: Semimicro Qualitative Analysis, 2d ed., 1942, McGraw-Hill, N. Y.